US012802573B2

(12) United States Patent
Robin et al.

(10) Patent No.: US 12,802,573 B2
(45) Date of Patent: Nov. 17, 2026

(54) COLLISION AVOIDANCE MONITORING SYSTEM AND METHOD FOR AN AIRCRAFT INVOLVED IN A FORMATION FLIGHT

(71) Applicant: Airbus Operations SAS, Toulouse (FR)

(72) Inventors: Jean-luc Robin, Toulouse (FR); Nicolas Warton, Toulouse (FR); Jean-Baptiste Berthier, Toulouse (FR); Paulina Piatkowska, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/266,431

(22) Filed: Jul. 11, 2025

(65) Prior Publication Data

US 2026/0038373 A1 Feb. 5, 2026

(30) Foreign Application Priority Data

Aug. 1, 2024 (FR) ...................................... 2408508

(51) Int. Cl.
*G08G 5/21* (2025.01)
*G08G 5/25* (2025.01)
(Continued)

(52) U.S. Cl.
CPC ................. *G08G 5/21* (2025.01); *G08G 5/25* (2025.01); *G08G 5/59* (2025.01); *G08G 5/78* (2025.01); *G08G 5/80* (2025.01)

(58) Field of Classification Search
CPC .. G08G 5/21; G08G 5/25; G08G 5/80; G08G 5/59; G08G 5/78
(Continued)

(56) References Cited

U.S. PATENT DOCUMENTS 5,521,817 A * 5/1996 Burdoin ............... G05D 1/0027 701/3
6,278,396 B1 * 8/2001 Tran ...................... G01S 13/933 342/36
(Continued)

FOREIGN PATENT DOCUMENTS

EP 3422134 A1 1/2019

OTHER PUBLICATIONS

French Search Report for corresponding French Patent Application No. 2408508 dated Feb. 25, 2025.

*Primary Examiner* — Kerri L McNally
(74) *Attorney, Agent, or Firm* — Greer, Burns & Crain, Ltd.

(57) ABSTRACT

A monitoring system for an aircraft involved in a formation flight as a trailing aircraft or as a leading aircraft comprises electronic circuitry configured to repeatedly implement the steps of receiving barometric altitude information from the leading aircraft, receiving barometric altitude information from the trailing aircraft, computing a difference between the barometric altitude of the leading aircraft and the barometric altitude of the trailing aircraft, determining an inconsistency between the barometric altitude of the trailing aircraft and the barometric altitude of the leading aircraft, within the context of the formation flight, if the computed difference is greater than a height value of the vortex at a current position of the trailing aircraft, increased by a height margin, and commanding, if such an inconsistency is determined, a transmission of a warning in the cockpit of the aircraft.

10 Claims, 3 Drawing Sheets

(51) Int. Cl.
*G08G 5/59* (2025.01)
*G08G 5/78* (2025.01)
*G08G 5/80* (2025.01)

(58) Field of Classification Search
USPC .......................................................... 340/961
See application file for complete search history.

(56) References Cited

U.S. PATENT DOCUMENTS

| | | | | |
|---|---|---|---|---|
| 2017/0297736 | A1* | 10/2017 | Frolov | B64D 43/00 |
| 2019/0004544 | A1* | 1/2019 | Feldmann | B64C 19/00 |
| 2019/0041875 | A1* | 2/2019 | Torralba | G01S 19/47 |
| 2019/0041876 | A1* | 2/2019 | Robin | G05D 1/104 |

* cited by examiner

COLLISION AVOIDANCE MONITORING SYSTEM AND METHOD FOR AN AIRCRAFT INVOLVED IN A FORMATION FLIGHT

CROSS-REFERENCES TO RELATED APPLICATIONS

This application claims the benefit of the French Application No. FR2408508 filed on Aug. 1, 2024, the entire disclosures of which are incorporated herein by way of reference.

FIELD OF THE INVENTION

The invention relates to the field of aircraft involved in a formation flight.

BACKGROUND OF THE INVENTION

It is well known that a fleet of aircraft flying in formation reduces the overall fuel consumption of the fleet. In a formation flight, one aircraft, called a trailing aircraft, flies close to a vortex generated by an aircraft, called a leading aircraft, it is following. The various aircraft involved in a formation flight fly close to each other, maintaining a specific geometry with respect to the relative positions of the various aircraft involved in the formation flight. Therefore, it is important to ensure the safety of the various aircraft involved in a formation flight by preventing any risk of collision between them. All transport aircraft are equipped with a collision avoidance system called TCAS (Traffic Collision Avoidance System). This system is designed to detect the risk of collision between aircraft and to command an avoidance maneuver when such a risk is detected.

During a formation flight, given that aircraft fly close to each other, finding a solution that provides redundancy for collision avoidance monitoring of aircraft involved in a formation flight would be beneficial.

SUMMARY OF THE INVENTION

The present invention notably aims to provide a solution to this problem. It relates to a monitoring system for an aircraft involved in a formation flight in which a trailing aircraft flies close to a vortex generated by a leading aircraft, with the aircraft corresponding to an aircraft from among the trailing aircraft and the leading aircraft, the monitoring system comprising electronic circuitry integrated in at least one avionics computer of the aircraft, wherein the electronic circuitry is configured to repeatedly implement, when the aircraft is involved in a formation flight, the following steps of:

- receiving barometric altitude information (a value of the barometric altitude) from the leading aircraft;
- receiving barometric altitude information (a value of the barometric altitude) from the trailing aircraft;
- computing a difference between the barometric altitude of the leading aircraft and the barometric altitude of the trailing aircraft;
- determining an inconsistency between the barometric altitude of the trailing aircraft and the barometric altitude of the leading aircraft, within the context of the formation flight, if the computed difference is greater than a height value of the vortex at a current position of the trailing aircraft, increased by a height margin; and
- commanding, if such an inconsistency is determined, the transmission of a warning in the cockpit of the aircraft.

During a formation flight, the various aircraft involved in this formation flight are supposed to be positioned relative to each other following a specific geometry such that a trailing aircraft flies close to a vortex generated by a leading aircraft, with the various aircraft being sufficiently spaced apart to avoid any risk of collision. The monitoring system according to the invention detects and indicates an inconsistency in the computed difference between the barometric altitude of the leading aircraft and the barometric altitude of the trailing aircraft, compared to a difference between the altitude of the leading aircraft and the altitude of the trailing aircraft compatible with a formation flight (at most corresponding to the height of the vortex increased by the height margin). Consequently, the system monitors compliance with the specific geometry by the leading aircraft and by the trailing aircraft. Since this specific geometry is designed to avoid any risk of collision between the aircraft involved in the formation flight, the monitoring of compliance with the specific geometry by the system is thus in addition to the collision avoidance monitoring carried out by the TCAS system. Consequently, the monitoring system according to the invention is redundant from the TCAS system.

According to various embodiments that can be taken individually or in combination:

- the electronic circuitry comprises a first part integrated into a TCAS-type collision avoidance monitoring system and a second part, independent of the TCAS-type collision avoidance monitoring system, in which the step of computing the difference between the barometric altitude of the leading aircraft and the barometric altitude of the trailing aircraft is implemented in the first part of the electronic circuitry and the step of determining an inconsistency between the barometric altitude of the trailing aircraft and the barometric altitude of the leading aircraft is implemented in the second part of the electronic circuitry;
- the electronic circuitry is further configured to implement a step of receiving information for identifying the leading aircraft when the aircraft corresponds to the trailing aircraft, or a step of receiving information for identifying the trailing aircraft when the aircraft corresponds to the leading aircraft;
- the electronic circuitry is further configured to automatically determine information for identifying the leading aircraft when the aircraft corresponds to the trailing aircraft or information for identifying the trailing aircraft when the aircraft corresponds to the leading aircraft, based on information received from the trailing aircraft and the leading aircraft;
- the electronic circuitry is further configured to command the aircraft involved in the formation flight to disengage if an inconsistency is determined between the barometric altitude of the trailing aircraft and the barometric altitude of the leading aircraft.

The invention also relates to a monitoring method for an aircraft involved in a formation flight in which a trailing aircraft flies close to a vortex generated by a leading aircraft, with the aircraft corresponding to an aircraft from among the trailing aircraft and the leading aircraft, the method comprising the following steps repeatedly implemented by electronic circuitry integrated into at least one avionics computer of the aircraft, when the aircraft is involved in a formation flight:

- receiving barometric altitude information from the leading aircraft;
- receiving barometric altitude information from the trailing aircraft;

computing a difference between the barometric altitude of the leading aircraft and the barometric altitude of the trailing aircraft;

determining an inconsistency between the barometric altitude of the trailing aircraft and the barometric altitude of the leading aircraft, within the context of the formation flight, if the computed difference is greater than a height value of the vortex at a current position of the trailing aircraft, increased by a height margin; and commanding, if such an inconsistency is determined, the transmission of a warning in the cockpit of the aircraft.

In one embodiment, the electronic circuitry comprises a first part integrated into a TCAS-type collision avoidance monitoring system and a second part, independent of the TCAS-type collision avoidance monitoring system. The step of computing the difference between the barometric altitude of the leading aircraft and the barometric altitude of the trailing aircraft is implemented in the first part of the electronic circuitry and the step of determining an inconsistency between the barometric altitude of the trailing aircraft and the barometric altitude of the leading aircraft is implemented in the second part of the electronic circuitry.

In one embodiment, the method further comprises a step of receiving information for identifying the leading aircraft when the aircraft corresponds to the trailing aircraft, or a step of receiving information for identifying the trailing aircraft when the aircraft corresponds to the leading aircraft.

In another embodiment, the method further comprises a step of automatically determining information for identifying the leading aircraft when the aircraft corresponds to the trailing aircraft or information for identifying the trailing aircraft when the aircraft corresponds to the leading aircraft, based on information received from the trailing aircraft and the leading aircraft.

The invention also relates to an aircraft comprising such a monitoring system.

BRIEF DESCRIPTION OF THE DRAWINGS

The invention will be better understood upon reading the following description and with reference to the accompanying figures.

DETAILED DESCRIPTION OF THE PREFERRED EMBODIMENTS

Figure 1:
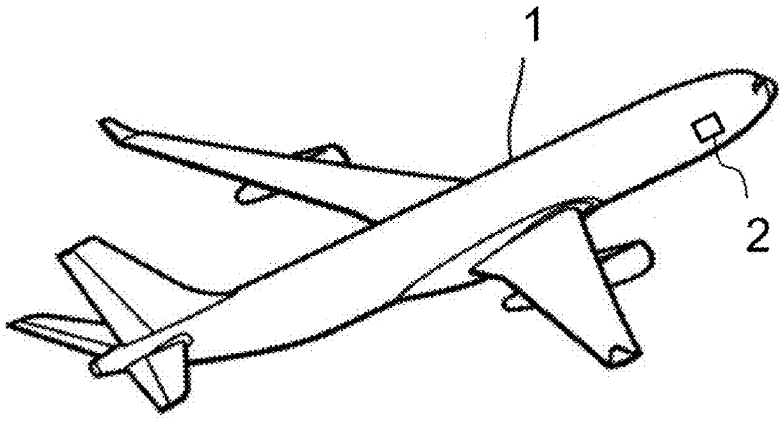
FIG. 1 is a view of an aircraft comprising a monitoring system according to one embodiment of the invention.
Figure 2:
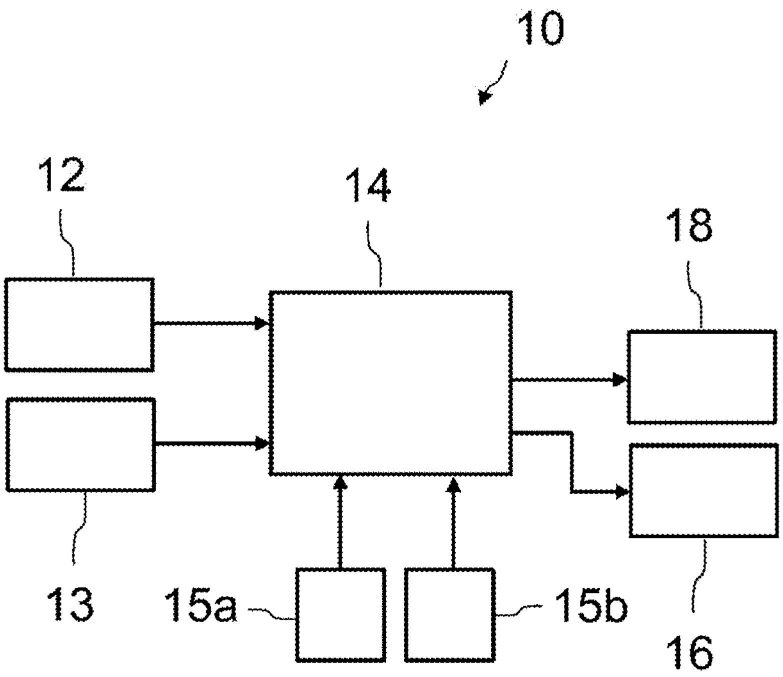
FIG. 2 schematically illustrates a monitoring system for an aircraft according to one embodiment of the invention.

The monitoring system 10 shown in FIG. 2 is installed on board an aircraft, such as the aircraft 1 shown in FIG. 1. When involved in a formation flight, the aircraft 1 corresponds to an aircraft from among a trailing aircraft 1S and a leading aircraft 1L involved in this formation flight. This monitoring system comprises electronic circuitry 14 integrated into at least one avionics computer of the aircraft, for example an avionics computer installed in an avionics bay 2 of the aircraft 1. The input of the electronic circuitry 14 is connected to a first information source 12 configured to provide barometric altitude information of the aircraft 1. The first information source 12 corresponds, for example, to an altimeter of the aircraft 1 or to an avionics system of the aircraft 1 receiving the barometric altitude information from an altimeter of the aircraft 1. The input of the electronic circuitry 14 is also connected to a second information source 13 configured to provide barometric altitude information from the other aircraft from among the trailing aircraft 1S and the leading aircraft 1L. Thus, when the aircraft 1 corresponds to the trailing aircraft 1S, the second information source 13 is an information source configured to provide barometric altitude information of the leading aircraft 1L, and when the aircraft 1 corresponds to the leading aircraft 1L, the second information source 13 is an information source configured to provide barometric altitude information of the trailing aircraft 1S. In a specific embodiment, the second information source 13 corresponds to a TCAS system of the aircraft 1 that is designed to receive barometric altitude values from aircraft surrounding the aircraft 1, with these surrounding aircraft including the other aircraft from among the trailing aircraft 1S and the leading aircraft 1L. This barometric altitude information from the surrounding aircraft is transmitted, for example, by transponders on the surrounding aircraft. The input of the electronic circuitry 14 is also connected to an information source 15*a* configured to provide information concerning the involvement of the aircraft 1 in a formation flight when the aircraft 1 is involved in a formation flight. According to a first alternative, the information source 15*a* corresponds to a human-machine interface in the aircraft cockpit configured to allow a member of the aircraft crew to enter information concerning the involvement of the aircraft in a formation flight. According to a second alternative, the information source 15*a* corresponds to an avionics computer of the aircraft 1, in particular an aircraft guidance computer, configured to provide information concerning the involvement of the aircraft in a formation flight when a formation flight guidance mode is activated. The output of the electronic circuitry 14 is also connected to a display system 18 in the cockpit of the aircraft 1, for example a CDS (Cockpit Display System) type system.

During operation, when a formation flight is initialized, the various aircraft, including the aircraft 1, involved in this formation flight position themselves relative to each other according to a specific geometry such that a trailing aircraft flies close to a vortex generated by a leading aircraft, with the various aircraft being sufficiently spaced apart to avoid any risk of collision. When the aircraft involved in the formation flight are positioned in a stable manner according to this specific geometry, a formation flight guidance mode is engaged for the aircraft 1. The information source 15*a* then transmits information to the electronic circuitry 14 indicating that the aircraft 1 is involved in a formation flight. Advantageously, this information also indicates whether the aircraft 1 is involved in the formation flight as a trailing aircraft 1S or as a leading aircraft 1L. The reception of the information that the aircraft 1 is involved in a formation flight corresponds to a step 30 of the method illustrated in FIG. 5. This step is denoted a in the figure.

From the time it is thus informed that the aircraft 1 is involved in a formation flight, the electronic circuitry 14 repeatedly implements the following steps while the aircraft 1 is involved in the formation flight. These steps are repeated, for example, at a predetermined frequency, for example, 1 Hz.

Figure 5:
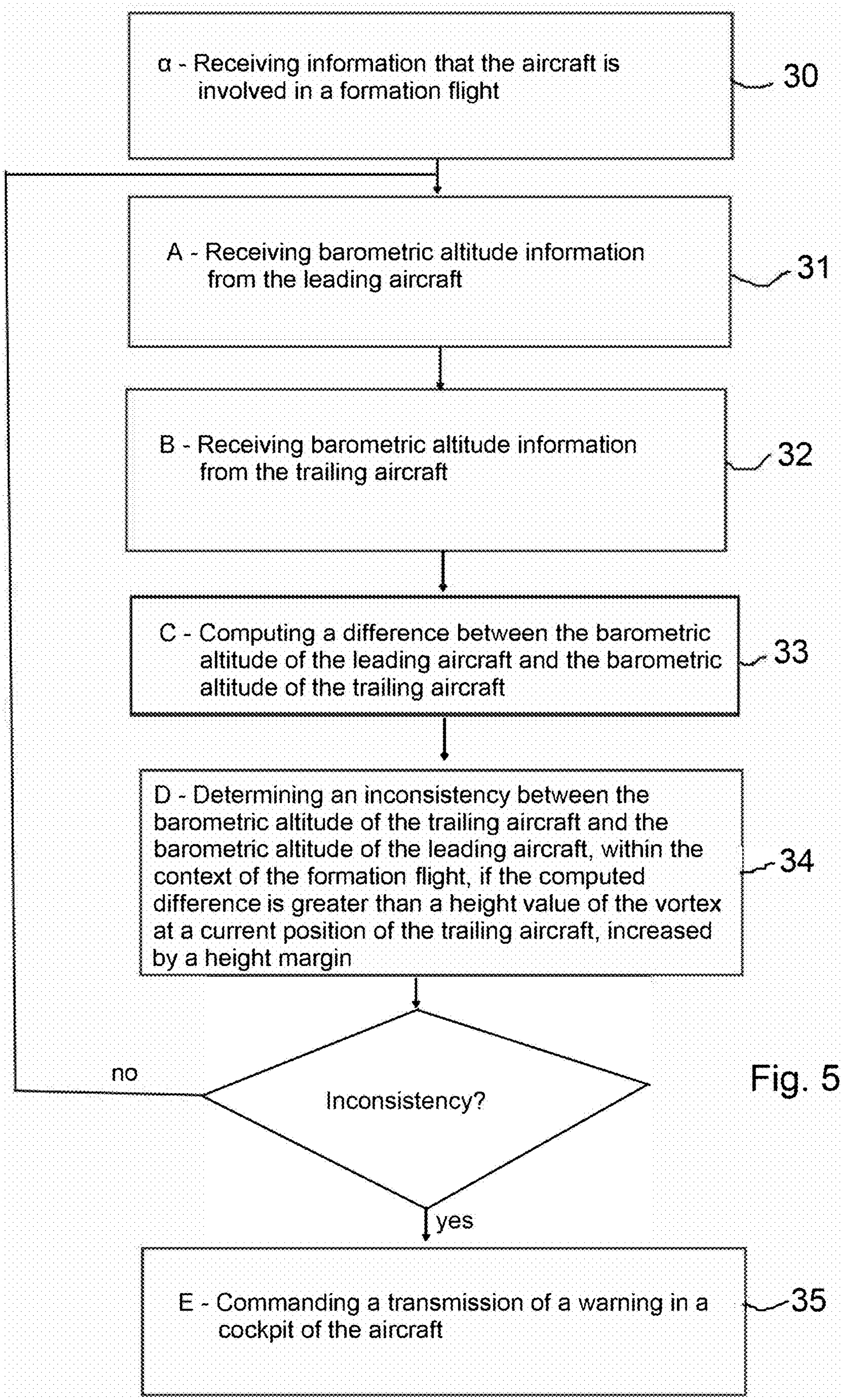
FIG. 5 shows a monitoring method for an aircraft according to one embodiment of the invention.

In a step 31, denoted A in FIG. 5, the electronic circuitry 14 receives barometric altitude information from the leading aircraft 1L. When the aircraft 1 corresponds to the trailing aircraft 1S, this barometric altitude information of the leading aircraft is received from the second information source 13. When the aircraft 1 corresponds to the leading aircraft 1L, this barometric altitude information of the leading aircraft is received from the first information source 12.

In a step 32, denoted B in FIG. 5, the electronic circuitry 14 receives barometric altitude information from the trailing aircraft 1S. When the aircraft 1 corresponds to the trailing aircraft 1S, this barometric altitude information of the leading aircraft is received from the first information source 12. When the aircraft 1 corresponds to the leading aircraft 1L, this barometric altitude information of the leading aircraft is received from the second information source 13.

Although step 31 is shown in FIG. 5 as preceding step 32, the chronological order of steps 31 and 32 by no means limits the invention, and either could occur first.

In a step 33, denoted C in FIG. 5, the electronic circuitry 14 computes a difference between the barometric altitude of the leading aircraft 1L and the barometric altitude of the trailing aircraft 1S. In a particular embodiment, this difference is computed as an absolute value.

Figure 4:
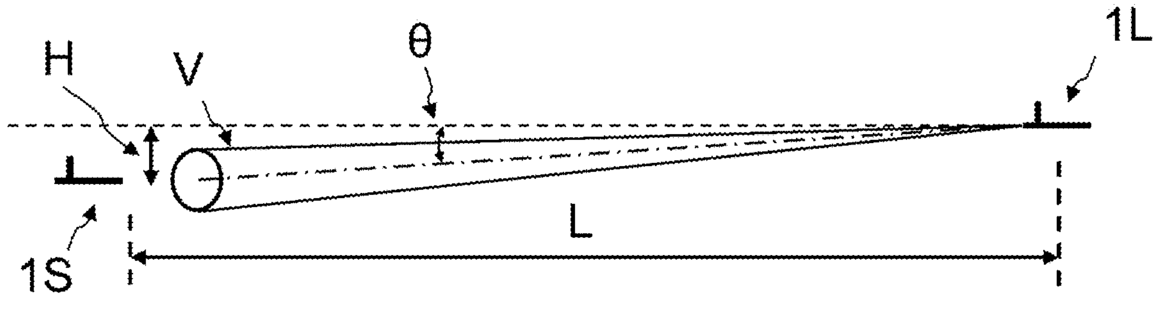
FIG. 4 illustrates a situation of a trailing aircraft relative to a leading aircraft.

In step 34, denoted D in FIG. 5, the electronic circuitry 14 determines an inconsistency between the barometric altitude of the trailing aircraft 1S and the barometric altitude of the leading aircraft 1L, within the context of formation flight, if the computed difference in step 32 is greater than a value of the height of the vortex at a current position of the trailing aircraft, increased by a height margin. As illustrated in FIG. 4, a current position of the trailing aircraft 1S relative to the leading aircraft 1L, particularly corresponding to a horizontal distance L between the leading aircraft 1L and the trailing aircraft 1S, has a corresponding vortex height H. Advantageously, the height H takes into account a slope θ between a longitudinal axis of the vortex and a horizontal straight line corresponding to the altitude of the leading aircraft, as illustrated in FIG. 4. The slope θ selected to determine the height H is, for example, a maximum value of the slope of the longitudinal axis of the vortex determined from a model. The height margin is selected so as to avoid unintentionally determining such an inconsistency due to small variations in the altitude of the leading aircraft 1L and/or of the trailing aircraft 1S, or even due to uncertainties in the barometric altitude information of the leading aircraft and of the trailing aircraft. Given that, when they are involved in a formation flight, the leading aircraft 1L and the trailing aircraft 1S are supposed to fly according to the aforementioned specific geometry, the difference between their barometric altitudes is supposed to substantially correspond to the vortex height H. Consequently, there is an inconsistency with the involvement of the aircraft in a formation flight if this difference is greater than the vortex height H increased by the height margin. Consequently, the monitoring system 10 helps to monitor compliance with the specific geometry by the leading aircraft 1L and by the trailing aircraft 1S. Since this specific geometry is intended to avoid any risk of collision between the aircraft involved in the formation flight, the monitoring of compliance with the specific geometry by the system is thus in addition to the collision avoidance monitoring carried out by the TCAS system. The monitoring system 10 is thus redundant from the TCAS system.

When an inconsistency between the barometric altitude of the trailing aircraft 1S and the barometric altitude of the leading aircraft 1L is determined in step 34, in a step 35, denoted E in FIG. 5, the electronic circuitry 14 commands the transmission of a warning in the cockpit of the aircraft 1 by sending an appropriate command to the display system 18.

Advantageously, the output of the electronic circuitry 14 is also connected to a guidance system 16 of the aircraft 1, for example a guidance computer of the FGS (Flight Guidance System) type. When an inconsistency between the barometric altitude of the trailing aircraft 1S and the barometric altitude of the leading aircraft 1L is determined in step 34, the electronic circuitry 14 also commands, in step 35, that the aircraft 1 disengages from involvement in the formation flight. For example, to this end the electronic circuitry 14 sends an appropriate command to the guidance system 16 of the aircraft.

More advantageously, the input of the electronic circuitry 14 is also connected to an information source 15*b* configured to provide information for identifying the other aircraft from among the leading aircraft 1L and the trailing aircraft 1S: when the aircraft 1 corresponds to the trailing aircraft 1S, the other aircraft corresponds to the leading aircraft 1L, and when the aircraft 1 corresponds to the leading aircraft 1L, the other aircraft corresponds to the trailing aircraft 1S. According to one embodiment, the information source 15*b* corresponds to a human-machine interface in the aircraft cockpit configured to allow a member of the aircraft crew to enter information for identifying the other aircraft. According to a variant, the information for identifying the other aircraft is determined automatically based on information relating to the flight of the leading aircraft 1L and the flight of the trailing aircraft 1S. In particular, this information includes at least one of the following: a heading of the leading aircraft or the trailing aircraft, position information of the leading aircraft and the trailing aircraft for computing a distance between the leading aircraft and the trailing aircraft, etc. In particular, the electronic circuitry 14 receives or determines the information for identifying the other aircraft in step 30 of the method.

When the aircraft 1 corresponds to the trailing aircraft 1S, electronic circuitry 14 uses the information for identifying the other aircraft in step 31 to select the barometric altitude received from the leading aircraft 1L, which then corresponds to the other aircraft. When the aircraft 1 corresponds to the leading aircraft 1L, the electronic circuitry 14 uses the information for identifying the other aircraft in step 32 to select the barometric altitude received from the trailing aircraft 1S, which then corresponds to the other aircraft.

Figure 3:
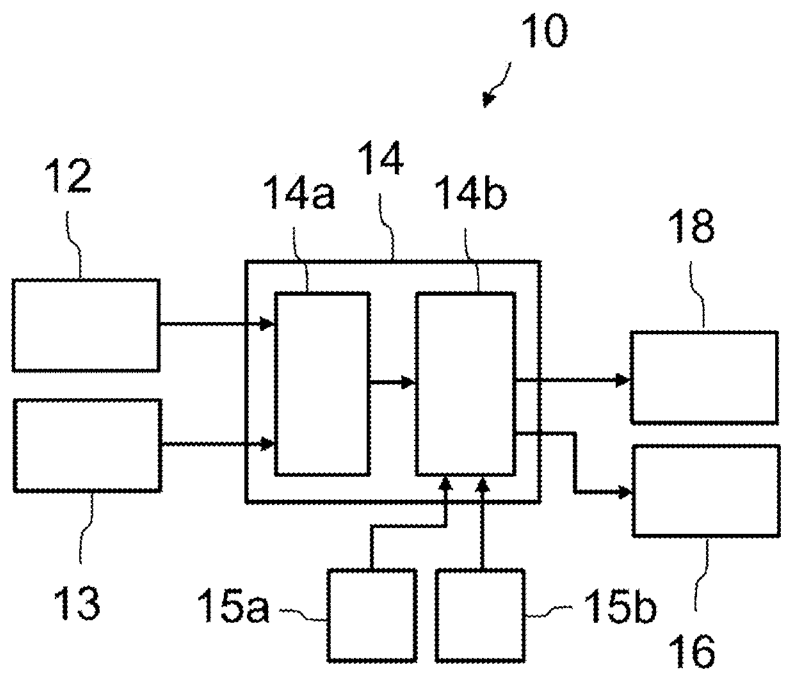
FIG. 3 schematically illustrates a monitoring system for an aircraft according to a particular embodiment of the invention.

In the particular embodiment illustrated in FIG. 3, the electronic circuitry 14 comprises a first part 14*a* integrated into a TCAS-type collision avoidance monitoring system and a second part 14*b* independent of the TCAS-type collision avoidance monitoring system. In particular, the TCAS collision avoidance system is installed on board the aircraft 1. The TCAS-type collision avoidance system is configured, in the usual manner, to receive the barometric altitude information from the leading aircraft 1L and the trailing aircraft 1S, and then to compute the difference between the barometric altitude of the leading aircraft and the barometric altitude of the trailing aircraft. Steps 31, 32 and 33 of the method are thus implemented in the first part 14*a* of the electronic circuitry. The first part 14*a* of the electronic circuitry transmits the difference in barometric altitude computed in step 33 to the second part 14*b* of the electronic circuitry. Step 34 of determining an inconsistency and, if necessary, step 35 are implemented in the second part 14*b* of the electronic circuitry.

In practice, the TCAS-type collision avoidance system receives the barometric altitude information from the aircraft 1, as well as the barometric altitude information respectively corresponding to each aircraft from among a fleet of aircraft surrounding the aircraft 1 (for example, the aircraft whose distance from the aircraft 1 is less than a distance threshold). On this basis, the TCAS system computes differences between the barometric altitude of the aircraft 1 and, respectively, the barometric altitudes of each aircraft in the fleet of aircraft surrounding the aircraft 1. In the particular embodiment illustrated in FIG. 3, these differences in barometric altitudes are transmitted by the first part 14*a* of the electronic circuitry, integrated into the TCAS system, to the second part 14*b* of the electronic circuitry. The second part 14*b* of the electronic circuitry uses the information for identifying the other aircraft from among the leading aircraft 1L and the trailing aircraft 1S (received from the information source 15*b* or determined automatically by the electronic circuitry 14) to select, from among these differences in barometric altitudes, the one that corresponds to the difference in altitude between the barometric altitude of the leading aircraft 1L and the barometric altitude of the trailing aircraft 1S.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A monitoring system for an aircraft involved in a formation flight in which a trailing aircraft flies close to a vortex generated by a leading aircraft, with the aircraft corresponding to an aircraft from among the trailing aircraft and the leading aircraft, the monitoring system comprising electronic circuitry integrated in at least one avionics computer of the aircraft, wherein the electronic circuitry is configured to repeatedly implement, when the aircraft is involved in the formation flight, the following steps of:

receiving information indicating a barometric altitude from the leading aircraft;

receiving information indicating a barometric altitude from the trailing aircraft;

computing a difference between the barometric altitude of the leading aircraft and the barometric altitude of the trailing aircraft;

determining an inconsistency between the barometric altitude of the trailing aircraft and the barometric altitude of the leading aircraft, within the context of the formation flight, if the computed difference is greater than a height value of the vortex at a current position of the trailing aircraft, increased by a height margin; and commanding, if such an inconsistency is determined, a transmission of a warning in a cockpit of the aircraft.

2. The system as claimed in claim 1, wherein the electronic circuitry comprises a first part integrated into a TCAS-type collision avoidance monitoring system and a second part, independent of the TCAS-type collision avoidance monitoring system, in which the step of computing the difference between the barometric altitude of the leading aircraft and the barometric altitude of the trailing aircraft is implemented in the first part of the electronic circuitry and the step of determining an inconsistency between the barometric altitude of the trailing aircraft and the barometric altitude of the leading aircraft is implemented in the second part of the electronic circuitry.

3. The system as claimed in claim 1, wherein the electronic circuitry is further configured to implement a step of receiving information for identifying the leading aircraft when the aircraft corresponds to the trailing aircraft, or a step of receiving information for identifying the trailing aircraft when the aircraft corresponds to the leading aircraft.

4. The system as claimed in claim 1, wherein the electronic circuitry is further configured to automatically determine information for identifying the leading aircraft when the aircraft corresponds to the trailing aircraft or information for identifying the trailing aircraft when the aircraft corresponds to the leading aircraft, based on information received from the trailing aircraft and the leading aircraft.

5. The system as claimed in claim 1, wherein the electronic circuitry is further configured to command the aircraft involved in the formation flight to disengage if the inconsistency is determined between the barometric altitude of the trailing aircraft and the barometric altitude of the leading aircraft.

6. A monitoring method for an aircraft involved in a formation flight in which a trailing aircraft flies close to a vortex generated by a leading aircraft, with the aircraft corresponding to an aircraft from among the trailing aircraft and the leading aircraft, the method comprising the following steps repeatedly implemented by electronic circuitry integrated into at least one avionics computer of the aircraft, when the aircraft is involved in the formation flight:

receiving information indicating a barometric altitude from the leading aircraft;

receiving information indicating a barometric altitude from the trailing aircraft;

computing a difference between the barometric altitude of the leading aircraft and the barometric altitude of the trailing aircraft;

determining an inconsistency between the barometric altitude of the trailing aircraft and the barometric altitude of the leading aircraft, within the context of the formation flight, if the computed difference is greater than a height value of the vortex at a current position of the trailing aircraft, increased by a height margin; and commanding, if such an inconsistency is determined, a transmission of a warning in a cockpit of the aircraft.

7. The method as claimed in claim 6, wherein, with the electronic circuitry comprising a first part integrated into a TCAS-type collision avoidance monitoring system and a second part, independent of the TCAS-type collision avoidance monitoring system, the step of computing the difference between the barometric altitude of the leading aircraft and the barometric altitude of the trailing aircraft is implemented in the first part of the electronic circuitry and the step of determining an inconsistency between the barometric altitude of the trailing aircraft and the barometric altitude of the leading aircraft is implemented in the second part of the electronic circuitry.

8. The method as claimed in claim 6, further comprising a step of receiving information for identifying the leading aircraft when the aircraft corresponds to the trailing aircraft, or a step of receiving information for identifying the trailing aircraft when the aircraft corresponds to the leading aircraft.

9. The method as claimed in claim 6, further comprising a step of automatically determining information for identifying the leading aircraft when the aircraft corresponds to the trailing aircraft or information for identifying the trailing aircraft when the aircraft corresponds to the leading aircraft, based on information received from the trailing aircraft and the leading aircraft.

10. An aircraft, comprising a monitoring system as claimed in claim 1.

* * * * *